UNITED STATES PATENT OFFICE.

LOUIS E. WISE, OF NEW YORK, N. Y., AND ELLIOT Q. ADAMS, OF BERKELEY, CALIFORNIA.

PROCESS OF MAKING PHOTOGRAPHIC SENSITIZING-DYES OF THE ISOCYANIN TYPE.

1,338,346.     Specification of Letters Patent.     Patented Apr. 27, 1920.

No Drawing.     Application filed February 10, 1919. Serial No. 276,151.

(FILED UNDER THE ACT OF MARCH 3, 1883, 22 STAT. L., 625.)

*To all whom it may concern:*

Be it known that we, LOUIS E. WISE and ELLIOT Q. ADAMS, citizens of the United States of America, and employees of the Department of Agriculture, residing in the city of New York, county of Westchester, State of New York, and in the city of Berkeley, county of Alameda, State of California, respectively, whose post-office address is Department of Agriculture, Washington, D. C., have invented new and useful Improvements in the Processes of Making Photographic Sensitizing-Dyes of the Isocyanin Type, of which the following is a specification.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon.

These dyes have been produced hitherto by the action of alcoholic potash in ethyl alcoholic solution upon suitable mixtures of the quaternary halids of an $\alpha$-methylated pyridin base with that of a $\gamma$-unsubstituted pyridin base, yielding the dye in a form that requires subsequent purification.

By $\alpha$-methylated pyridin bases are meant such derivatives of pyridin, quinolin and related bases as have a methyl group adjacent to the nitrogen of the heterocyclic ring, *e. g.*, toluquinaldin. By $\gamma$-unsubstituted pyridin bases are meant pyridin, quinolin and related bases, and such of their derivatives as have an unsubstituted hydrogen diametrically opposite the nitrogen in the heterocyclic ring.

We have found that these dyes can be obtained directly in a state of sufficient purity by the action of sodium methylate in absolute methyl alcoholic solution upon the hereinbefore-mentioned quaternary halids, or somewhat less satisfactorily by the action of aqueous or ethyl alcoholic alkalis in ordinary methyl alcoholic solution.

The following examples will serve to illustrate the preferred procedure. The invention, however, is not confined to these examples. The parts are by weight:

Example 1: 14 parts p-toluquinaldin methiodid and 25.8 parts quinolin methiodid (anhydrous) are dissolved in 320 parts of absolute methyl alcohol and the solution heated to boiling in an open vessel. A solution of sodium methylate, prepared by dissolving 1.2 parts of metallic sodium in 72 parts absolute methyl alcohol is gradually added to the boiling solution. After the addition is complete, the mixture is concentrated to four-fifths of its initial volume, and is then permitted to cool very slowly, whereupon the dyes comes down in crystals (resembling brassy splinters) from which the mother liquor may be siphoned or decanted, and the adhering mother liquor removed by washing with mixtures of methyl alcohol and (ethyl) ether. The crystallization is facilitated by the introduction of a small amount of material from a preceding batch.

Cautious concentration of the mother liquors may yield a further amount of the dye.

Example 2: 3.13 parts p-toluquinaldin ethiodid and 6 parts p-toluquinolin ethiodid are dissolved in 64 parts of absolute methyl alcohol and the solution heated to boiling in an open vessel. A solution of sodium methylate, prepared by dissolving 0.23 part of metallic sodium in 16 parts absolute methyl alcohol, is gradually added to the boiling solution. After the addition is complete, the mixture is concentrated to four-fifths of the initial volume and permitted to cool very slowly, whereupon the dye comes down in green crystals from which the mother liquor may be siphoned or decanted, and the adhering mother liquor removed by washing with mixtures of methyl alcohol and (ethyl) ether. The crystallization is facilitated by the introduction of a small amount of material from a preceding batch.

Cautious concentration of the mother liquors may yield a further amount of dye.

Having now fully described our invention, what we claim and desire to protect by Letters Patent is—

1. The process of producing photographic sensitizing dyes by the interaction of sodium methylate in absolute methyl alcoholic solution with mixtures of the quaternary halid addition products of an $\alpha$-methylated quinolin derivative and of a γ-unsubstituted quinolin derivative.

2. The process of producing photographic sensitizing dyes by the interaction of sodium methylate in absolute methyl alcoholic solution with mixtures of the quaternary halid addition products of an α-methylated pyridin base and of a γ-unsubstituted pyridin base.

3. The process of producing photographic sensitizing dyes by the interaction of sodium methylate in absolute methyl alcoholic solution with mixtures of the quaternary addition products of an α-methylated pyridin base and of a γ-unsubstituted pyridin base.

4. The process of producing photographic sensitizing dyes by the interaction of sodium methylate in methyl alcoholic solution containing small quantities of water with mixtures of the quaternary addition products of an α-methylated pyridin base and of a γ-unsubstituted pyridin base.

5. The process of producing photographic sensitizing dyes by the interaction of alkali in methyl alcoholic solution containing small quantities of water with mixtures of the quaternary addition products of an α-methylated pyridin base and of a γ-unsubstituted pyridin base.

In testimony whereof, we affix our signatures in the presence of two subscribing witnesses.

LOUIS E. WISE.
ELLIOT Q. ADAMS.

Witnesses:
B. G. FEINBERG,
L. A. MIKESKA.